United States Patent
Ayzenberg

[19]

[11] Patent Number: 5,926,648
[45] Date of Patent: Jul. 20, 1999

[54] I/O PORT AND RAM MEMORY ADDRESSING TECHNIQUE

[75] Inventor: Oscar Ayzenberg, Sunnyvale, Calif.

[73] Assignee: Zilog, Inc., Campbell, Calif.

[21] Appl. No.: 08/701,385

[22] Filed: Aug. 22, 1996

[51] Int. Cl.$^6$ ..................................................... G06F 13/00
[52] U.S. Cl. .......................................... 395/823; 395/856
[58] Field of Search ................................. 395/823, 821, 395/829, 840, 824, 846, 856

[56] References Cited

U.S. PATENT DOCUMENTS

| | | | |
|---|---|---|---|
| 4,755,934 | 7/1988 | Inoue | 395/823 |
| 4,777,589 | 10/1988 | Boettner et al. | 364/200 |
| 4,815,034 | 3/1989 | Mackey | 364/900 |
| 4,849,931 | 7/1989 | Ishii et al. | 395/823 |
| 4,922,410 | 5/1990 | Morikawa et al. | 395/823 |
| 5,146,565 | 9/1992 | Blanck et al. | 395/856 |
| 5,465,330 | 11/1995 | Komatsu et al. | 395/824 |
| 5,481,753 | 1/1996 | Miyake et al. | 395/823 |
| 5,721,947 | 2/1998 | Priem et al. | 395/824 |

*Primary Examiner*—Robert W. Beausoliel, Jr.
*Assistant Examiner*—Scott T. Baderman
*Attorney, Agent, or Firm*—Majestic, Parsons, Siebert & Hsue

[57] ABSTRACT

A method and apparatus for addressing and writing data to extended I/O ports and additional RAM memory is provided, wherein a microprocessor sends both address and data information by way of a bus. The technique comprises the steps of writing to a first field of the bus an I/O port or RAM memory access code, to a second field of the bus an address for addressing a selected I/O port or RAM memory space for writing data thereto, and to a third field of the bus data which is to be written to the selected I/O port or RAM memory space; detecting whether the first field of the bus contains such access codes; decoding the address in the second field of the bus for selecting the selected I/O port; and writing data in third field of the bus to the selected I/O port or RAM memory if the access code has been detected.

7 Claims, 5 Drawing Sheets

I/O PORT AND RAM MEMORY ADDRESSING TECHNIQUE

FIELD OF THE INVENTION

This invention relates generally to an apparatus and method for addressing and writing to I/O ports and RAM memory, and more particularly, to an apparatus and method that uses a bus of a microprocessor-based system for both addressing and writing data to I/O ports and RAM memory.

BACKGROUND OF THE INVENTION

The processing of video signals in television receivers, video cassette recorders (VCRs), set-top boxes and the like, have recently become increasingly complex. Part of the reason for this is that more extraneous information, apart from that provided in the standard composite video signal, is being incorporated into the standard video signal. Such extraneous information include close-caption information, V-chip information, other XDS information and StarSight information. As more information is incorporated into the standard video signal, the more complex the video signal processing becomes.

Generally, the trend in video signal processing in television receivers, VCRs, set-top boxes and the like, is to implement it using digital signal processing technology. Digital signal processing provides advantages over analog signal processing in that digital signals are less susceptible to noise, interference and degradation; digital signal processing circuits are generally easier to implement in integrated circuit form, which results in ease and time savings in manufacturing; and digital signals are more amenable to control by way of microprocessors and computers. However, as noted above, since video signal processing is getting more complex, more demand for performance is placed on digital signal processing circuits.

The primary component of a digital signal processing circuit is the microprocessor or central processing unit (CPU). The CPU in a television receiver has to perform numerous functions in order to process the incoming television signal, including the extraneous information riding on the composite video signal, so that proper video images are displayed on the television's cathode ray tube (CRT) and audio sounds are produced. Such functions, to name a few, include video and audio signal processing, sync signal processing, analog-to-digital and vice-versa conversions, CRT control, vertical blanking interface (VBI) data decoding, infrared (I.R.) remote capturing, and program and character generations. Because the CPU in these video processing units has to perform numerous functions, lots of demand is placed on the CPU for performance, especially for speed.

Generally, the use of a general purpose microprocessor serving as the CPU for such video processing units is not desired. General purpose micro-processors tend to have relatively slow data throughput. In other words, they generally require multiple clock cycles for executing instructions and transferring data. Accordingly, because of the speed performance requirement for video signal processing, general purpose micro-processors usually do not meet such performance demand.

Rather, what is preferably employed in video processing units are specialized micro-processors which are specifically designed to process video signals efficiently and with relatively fast data throughput. One specialized microprocessor, for example, is incorporated in the Z89300 television microcontroller manufactured by the assignee of this invention, Zilog Inc. The Z89300 controller microprocessor is a high performance 16-bit RISC processor optimized for data processing and transfer. This microprocessor is typically around 10 faster than general purpose microprocessor in data processing and transfer. It generally requires only one (1) clock cycle for executing instructions and transferring data, for example, between random access memory (RAM) and read only memory (ROM). Thus, this microprocessor is ideal for video signal processing, among other high-speed applications.

The Z89300 controller microprocessor, however, only provides three bits for accessing input/output (I/O) ports for communicating with external devices. The 3-bit I/O resolution provides for eight (8) I/O ports direct access. The microprocessor also has two (2) bit control output which can be combined with the 3-bit for accessing up to 32 I/O ports. Although for many applications this may be more than enough for accessing external devices, there may be specific applications where more than 32 external devices are required to communicate with the microprocessor. Such specific applications may include, for example, television video and audio signal processing. Because of the increasing complexity of television receivers, more external devices require communication with such receivers' microprocessor. These devices can include, among others, units for image attribute control, such as brightness, contrast, saturation and hue; interface buses, such as $I^2C$ bus, RS232 parallel bus and serial bus; I.R. data and control unit, clock speed control unit, on screen display unit and close-caption unit. Such devices can easily grow to over 32 devices and exceed the microprocessor's I/O access capability.

The prior art's approach for providing more access to I/O ports than the microprocessor provides is to allocate a portion of the microprocessor's RAM memory for performing I/O accessing. More specifically, the microprocessor is programmed to map calls to those I/O ports that exceed the microprocessor's I/O access capability to certain address space in the processor's RAM memory. This approach, however, has the drawback of giving up available RAM memory space for I/O accessing; an undesired approach if RAM memory space is scarce. The lack of memory space is now more prolific since more software applications require more RAM memory space for performing their tasks.

Hence, there is a need for an apparatus and method for providing I/O access for I/O ports that exceed the microprocessor's access capability without taking up memory space from RAM memory. There is also a need for a technique and apparatus for accessing I/O ports that exceed the microprocessor access capability without causing the processor to execute complicated routines and where the access time is relatively short for speed purposes; this would be especially advantageous for video signal processing.

OBJECTS OF THE INVENTION

It is an object of the invention to provide an apparatus and method for accessing I/O ports that exceed a microprocessor's I/O addressing capability.

It is another object of the invention to provide an apparatus and method for accessing I/O ports that exceed a microprocessor's I/O addressing capability without using RAM memory space to do so.

It is another object of the invention to provide an apparatus and method for accessing I/O ports that exceed a microprocessor's I/O addressing capability without having the need for the microprocessor to execute complicated routines and where the access time is relatively short.

It is an object of the invention to provide an apparatus and method for accessing additional RAM memory.

It is another object of the invention to provide an apparatus and method for accessing additional RAM memory without using the microprocessor's RAM memory to do so.

It is another object of the invention to provide an apparatus and method for accessing additional RAM memory without having the need for the microprocessor to execute complicated routines and where the access time is relatively short.

SUMMARY OF THE INVENTION

These and additional objects are accomplished by the various aspects of the present invention, wherein, briefly and generally, a method of addressing and writing data to I/O ports is provided, wherein a microprocessor sends both address and data information by way of a bus. The technique comprises the steps of writing to a first field of the bus an I/O port access code, to a second field of the bus an address for addressing a selected I/O port for writing data thereto, and to a third field of the bus data which is to be written to the selected I/O port; detecting whether the first field of the bus contains the I/O port access code; decoding the address in the second field of the bus for selecting the selected I/O port; and writing data in third field of the bus to the selected I/O port if the I/O port access code has been detected.

In another aspect of the invention, an apparatus is provided for performing the above I/O access method. More specifically, a microprocessor system is provided for utilizing a system's bus for addressing and writing data to I/O ports. The microprocessor system includes a bus having a first, second and third field assigned to transmit an I/O access code, an address and data, respectively; wherein the third field is coupled to the data input of the I/O ports for transmitting data thereto. The microprocessor system further includes a microprocessor coupled to the bus for writing instructions to the bus, such as the I/O access code to the first field, the address to the second field and the data to the third field. Also included in the microprocessor system is means for selecting an I/O port for writing data thereto, wherein the selecting means is coupled to the second field of the bus for receiving an address corresponding to the selected I/O port. Furthermore, the microprocessor system includes means for detecting the I/O access code in the first field of the bus, wherein the detecting means is coupled to the I/O ports for enabling writing data to I/O ports if the I/O access code is detected.

Yet in another aspect of the invention, a method is provided for addressing and writing to additional RAM memory, apart from the microprocessor's RAM memory, in a microprocessor system having a bus in data communication with a microprocessor. The method comprises the steps of writing to a first field of the bus a RAM memory access code, to a second field of the bus an address for a selected memory space of the RAM memory for writing data thereto, and to a third field of the bus data for writing to the selected memory space of the RAM memory; detecting whether the first field of the bus contains the RAM memory access code; and writing data in the third field of the bus to the selected memory space of RAM memory if the RAM memory access code has been detected.

Still in another aspect of the invention, an apparatus is provided for performing the above additional RAM access method. More specifically, a microprocessor system is provided having a bus for writing data contained therein to a RAM memory. The system comprises a bus having a first, second and third field assigned to transmit a RAM memory access code, an address and data, respectively; wherein the second field of the bus is coupled to the address input of the RAM memory for transmitting an address thereto, and wherein the third field of the bus is coupled to the data input of the RAM memory for transmitting data thereto. The system further includes a microprocessor coupled to said bus for writing instructions to the bus, such as the I/O access code to the first field, the address to the second field and the data to the third field of the bus. The microprocessor system also includes means for detecting the RAM access code present in the first field of the bus, wherein the detecting means is coupled to the RAM memory for enabling writing data to the RAM memory if said RAM memory access code is detected.

Additional objects, features and advantages of various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
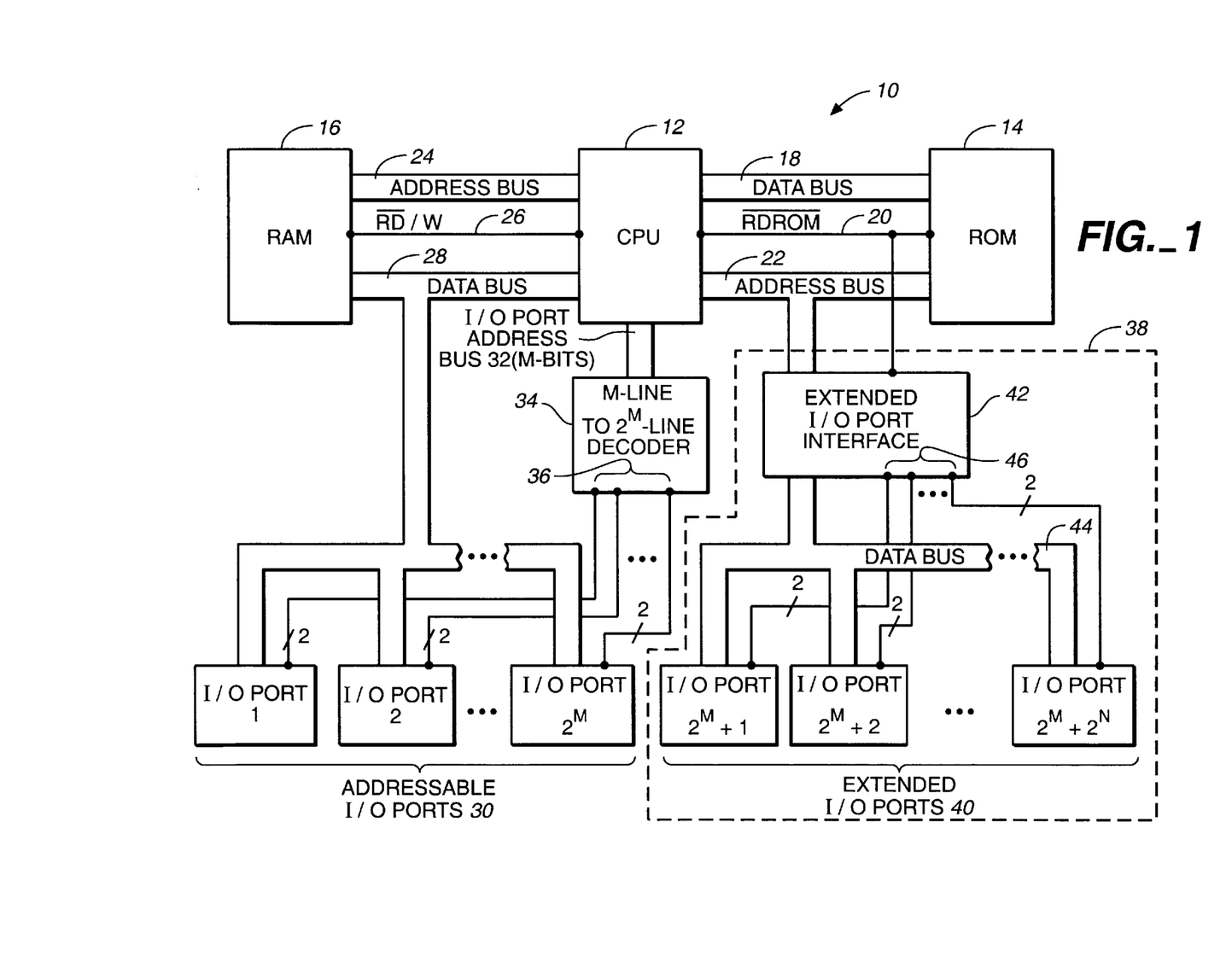
FIG. 1 illustrates as an example a block diagram of a microprocessor system for addressing and writing data to I/O ports as embodied in the invention.

Referring to FIG. 1, an example of a microprocessor system 10 embodying the invention is shown. The microprocessor system 10 includes some components which are typically incorporated in microprocessor systems employed today. It includes a microprocessor or CPU 12, such as for example the microprocessor incorporated in the Zilog, Inc. Z89300 television controller, being in communication with or coupled to a ROM memory 14 by way of ROM data bus 18, read-ROM ($\overline{\text{RDROM}}$) control line 20 and ROM address bus 22. In the Z89300 television controller, for example, the data bus 18 is a 16-bit bus, the $\overline{\text{RDROM}}$ control line 20 is one (1) bit, and the address bus 22 is a 16-bit bus. Although the description of the invention will use the system architecture of the Z89300 television controller for illustrating the invention, it shall be understood that the invention applies to any microprocessor systems which includes a bus, such as an address bus, a data bus or a control bus; although, the invention will be described with reference to an address bus as an example.

The microprocessor system 10 further includes a RAM memory 16 in data communication with or coupled to the CPU 12 by way of a RAM address bus 24, a read-write ($\overline{RD}$/W) control line 26 and a RAM data bus 28. In the Z89300 television controller, for example, the RAM address bus is an 8-bit bus, the $\overline{RD}$/W control line 26 is one (1) bit, and the RAM data bus 28 is an 8-bit bus.

The microprocessor system 10 further includes a plurality of addressable I/O port registers 30 (I/O port (1) through I/O port ($2^M$)) which are in communication with the CPU 12 by way of an I/O port address bus 32, having for example M bits for communicating, and by way of an M-line-to-$2^M$-line decoder 34 for selecting a particular I/O port for communicating with the CPU 12. Each of the addressable I/O ports 30 have a data input coupled to the RAM data bus 28 for receiving data therefrom and have a select input coupled to the M-line-to-$2^M$-line decoder 34 by way of lines 36. In the case where the microprocessor system has a common data bus for both the RAM and ROM memory, such plurality of I/O ports would be coupled to such common bus. The term addressable I/O ports 30 means that these ports are addressed by the CPU 12 through the CPU's standard I/O control signals, which in combination herein is referred to as the I/O port address bus 32.

Taking the microprocessor incorporated in the Zilog, Inc. Z89300 television controller as an example, it has three (3) I/O control lines for accessing I/O ports. That microprocessor further includes two (2) control bits which can be combined with the three (3) I/O control lines to form an I/O port address bus having five (5) bits for addressing. If "M" represents the number of bits in the I/O address bus, then with the I/O accessing configuration shown in FIG. 1, 32 ($2^{M=5}$) I/O ports can be accessed. Thus, in this case there are 32 addressable I/O ports 30.

As mentioned earlier, there may be some applications, such as television video signal processing, where the number of devices that needs to communicate with the CPU 12 exceed the maximum amount of addressable I/O ports 30, i.e. $2^M$ or 32 for the Z89300 controller's microprocessor. Again, such devices can include, among others, units for image attribute control, such as brightness, contrast, saturation and hue; interface buses, such as $I^2C$ bus, RS232 parallel bus and serial bus; I.R. data and control unit, clock speed control unit, on screen display unit and close-caption unit. Therefore, there is a need for a method and apparatus for extending the number of accessible I/O ports beyond the maximum amount of addressable I/O ports 30 available.

The microprocessor system 10 of FIG. 1 provides hardware 38 for performing such method and for extending the number of accessible I/O ports beyond the maximum amount of addressable I/O ports 30. The technique for doing so involves sending both address and data information to the extended I/O ports 40 by way of a bus, preferably an address bus. More specifically, the method involves assigning certain fields of the address bus for transmission of mode, address, and data information. The term extended I/O ports is defined as the I/O ports that exceed the maximum amount of addressable I/O ports.

Figure 2:
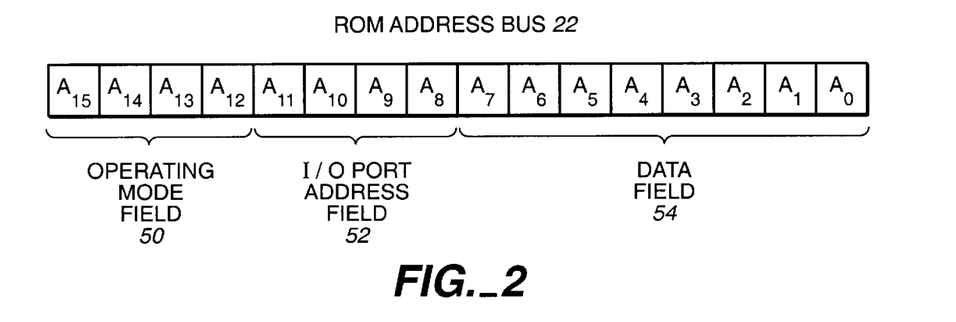
FIG. 2 illustrates as an example a diagram of assignment of fields of an address bus for performing I/O port accessing tasks that are embodied in the invention.

Referring to FIG. 2, a diagram that depicts the assignment of certain fields of the ROM address bus 22 for transmitting mode, address and data information is shown. For example, the ROM address bus 22 of the Z89300 television controller, which is a 16-bit bus, can be partitioned into three fields: an operating mode field 50 for transmitting an I/O access code when extended I/O port access is desired, an I/O port address field 52 for transmitting an address for selecting a particular I/O port for which data is to be written to, and a data field 54 for transmitting data to the selected I/O port.

The operating mode field 50 is used to select the operating mode of the ROM address bus 22. More specifically, if the operating mode field 50 of the ROM address bus 22 contains a specified I/O port access code, then the address bus is being operated to write address and data information to the extended I/O ports. If, on the other hand, the I/O port access code is not present in the operating mode field 50 of the address bus 22, then the address bus is being operated in a rom-access mode, for reading data from the ROM memory. In the example field allocation shown in FIG. 2, the operating mode field 50 is assigned to the first four (4) most significant bits ($A_{12}$–$A_{15}$) of the ROM address bus 22.

If the operating mode field 50 of the ROM address bus 22 contains the I/O port access code and it is detected, then the address in the I/O port address field 52 of the address bus 22 is used to select a particular I/O port among the extended I/O ports 40 for data to be written to. If that is the case, then the data present in the data field 54 of the ROM address bus 22 is written to the selected I/O port. In the example field allocation shown in FIG. 2, the I/O address field 52 has been assigned to bits $A_8$–$A_{11}$, and the data field 54 has been assigned to bits $A_0$–$A_7$ of the ROM address bus 22.

Although in the example field allocation shown in FIG. 2 the operating mode field 50 has been assigned to bits $A_{12}$–$A_{15}$, the I/O port address field 52 to bits $A_8$–$A_{11}$, and the data field 54 to bits $A_0$–$A_7$ of the ROM address bus 22, it shall be understood by one skilled in the art that these fields do not have to be assigned in this particular order. They can be assigned in any order so long as the software program running the CPU keeps track which field contains what information. In addition, it shall also be understood by those skilled in the art that each field need not be grouped as continuous set of bits, but may be assigned randomly; again, so long as the software program running the CPU keeps track which bits are allocated for transmitting what information. However, it may not be desirable to allocate fields in non-grouped random fashion for ease of the programmer and the software program implementation.

This method of using the ROM address bus for addressing and writing to extended I/O ports, however, reduces the available memory space in ROM memory 14 for accessing. The reason for this is that the I/O port access code in the operating mode field 50 of the ROM address bus 22 is reserved for I/O access and not accessing ROM memory. Thus, any address in the ROM address bus that contains the I/O port access code cannot be used for accessing ROM memory. In the example field allocation of FIG. 2, the I/O port access code is four (4) bits in length. Therefore, 4K ($2^{12}$) bytes are reserved for I/O access and 60K bytes are reserved for ROM access. The more bits are reserved for the I/O port access code, the more ROM memory is available; however, less field space is available for address and data for extended I/O ports. In this case, if the data field 54 is kept constant (such as for an 8-bit word), for example, then less extended I/O ports can be accessed because of a smaller I/O address field 52. On the other hand, if lesser bits are reserved for the I/O port access code, then lesser ROM memory space is available; but more field space is available for the address and data for extended I/O ports. In this case, if the data field 54 is kept constant (such as for an 8-bit word), then more extended I/O ports can be accessed since the I/O address field 52 is larger. The bit-length of the fields 50, 52 and 54 can be apportioned in any manner to meet a particular application's needs.

Referring back to FIG. 1, an apparatus 38 for performing the above-described technique for accessing extended I/O ports is shown. The I/O port extender 38 includes a plurality of extended I/O port registers 40 (I/O port ($2^M$+1) through I/O port ($2^M$+$2^N$)) in communication with an extended I/O port interface 42 by way of an extended I/O data bus 44 and extended I/O control signals 46. The I/O port extender 38 is coupled to the microprocessor system 10 by way of the extended I/O port interface 42 being coupled to the ROM address bus 22 and the RDROM control signal 20. The variable "N" is the bit-length of the I/O port address field 52, and accordingly, there are $2^N$ extended I/O ports 40. The first extended I/O port is referenced as I/O port ($2^M$+1) since I/O port ($2^M$) is the last addressable I/O port 30. For the example field allocation of FIG. 2, the bit-length of the I/O port address field 52 is N=4, and therefore, there are 16 extended I/O ports 40.

The extended I/O port interface 42 performs various tasks. First, it monitors the code in the operating mode field 50 of the ROM address bus 22 and detects whether the I/O port access code is present in field 50. Second, it monitors the $\overline{\text{RDROM}}$ control signal 20 and detects whether that signal is in a reading-rom state. Third, it decodes the address in the I/O port address field 52 for selecting a particular I/O port among the extended I/O ports 40 for which data is to be written to. Fourth, it couples the data in the data field 54 of the ROM address bus 22 to the extended I/O ports 40; although, as will be discussed in more detail later, in the preferred embodiment the data field 52 is directly coupled to the data input of each extended I/O port. Fifth, the extended I/O port interface 42 enables writing data to the selected I/O port by way of control lines 46 if the $\overline{\text{RDROM}}$ control signal 22 is in the reading-rom state and the I/O port access code is present in the operating mode field 50 of the ROM address bus 22.

Figure 3:
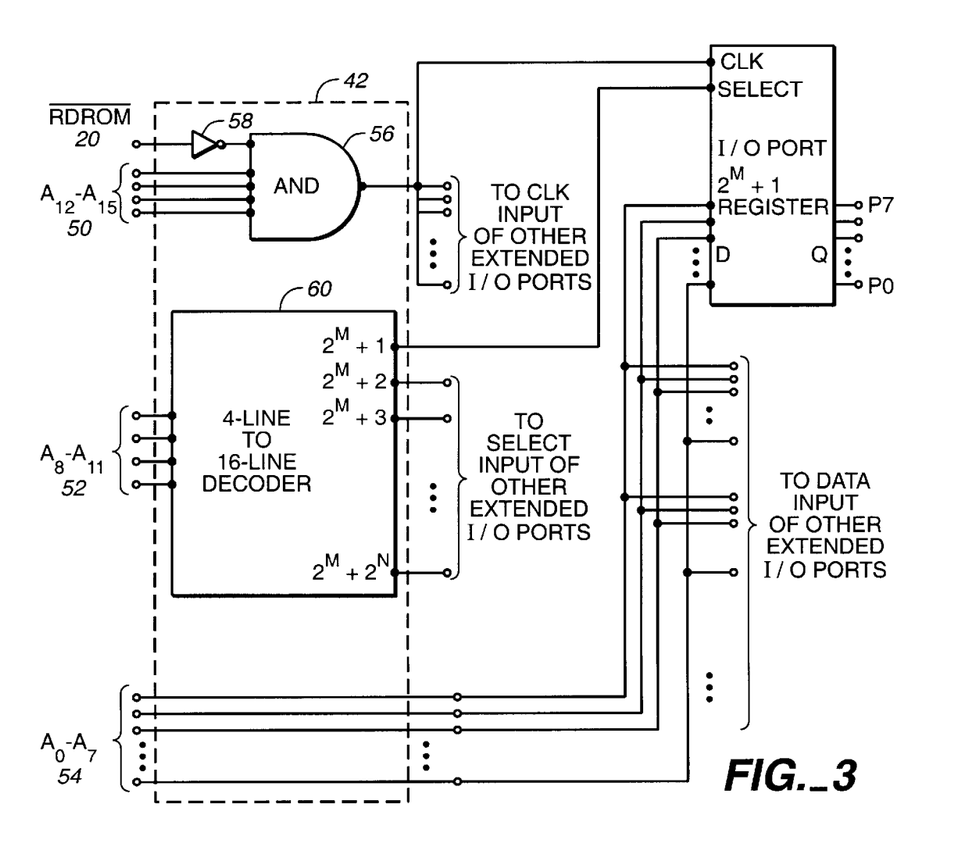
FIG. 3 illustrates as an example a block diagram of an extended I/O port interface of the microprocessor system of FIG. 1 as embodied in the invention.

Referring to FIG. 3, a particular implementation of the extended I/O port interface 42 is shown being in communication with one of the extended I/O ports 40 (i.e. I/O port ($2^M$+1), for example) for illustrating the function of the device. This particular implementation 42 operates for the particular field allocation of the ROM address bus 22 that is exemplified in FIG. 2. In addition, this particular implementation operates for an I/O port access code of ($A_{12}$–$A_{15}$) (1111).

The extended I/O port interface 42 includes a multi-input AND-Gate 56 having inputs coupled to the operating mode field 50 ($A_{12}$–$A_{15}$) of the ROM address bus 22, and another input coupled to the $\overline{\text{RDROM}}$ control signal 20 by way of an inverter 58. The AND-Gate 56 has an output coupled to the clock input of each I/O port of the extended I/O ports 40; for ease of illustration FIG. 3 shows only a connection to I/O port ($2^M$+1). The AND-Gate 56 monitors the operating mode field 50 and the $\overline{\text{RDROM}}$ control signal and transmits a high to the clock input of the extended I/O ports 40 when both the I/O access code and a reading-rom state has been detected. For example, if the $\overline{\text{RDROM}}$ signal is low (0) meaning it is in a reading-rom state, and the operating mode field 50 ($A_{12}$–$A_{15}$) of the ROM address bus 22 contains the I/O port access code ($A_2$–$A_{15}$)=(1111), then all inputs of the AND-Gate 56 are high and the Gate issues a high to the clock input of the extended I/O ports 40. It shall be understood that if the I/O port access code ($A_{12}$–$A_{15}$) is not defined as (1111), then other logic circuits shall be substituted for the AND-Gate 56 so that such circuits issue a high when the I/O port access code is present in the operating mode field 50 and the $\overline{\text{RDROM}}$ control line 20 is in a reading state.

The interface 42 also includes a 4-line-to-16-line decoder 60 having inputs coupled to the I/O port address field 52 ($A_8$–$A_{11}$) of the ROM address bus 22 and one of each of its outputs coupled to the select input of each corresponding extended I/O port 40. The decoder 60 reads the address in the I/O port address field 52 of the ROM address bus 22 and selects the I/O port corresponding to such address for writing data thereto. For example, if the I/O port address field 52 contains an address of ($A_8$–$A_{12}$)=(0000), then the decoder's $2^M$+1 output bit goes high and selects I/O port ($2^M$+1) for writing data thereto.

In the preferred embodiment, the data field 54 ($A_0$–$A_7$) of the ROM address bus 22 is directly coupled to each data input of the extended I/O ports 40. The data field 54 has been shown in FIG. 3 to be coupled to each data input of the extended I/O ports 40 by way of interface 42 to illustrate that the function of the interface is to couple to the various fields of the ROM address bus 22 in order to transmit their contents properly to the extended I/O ports.

Figure 4A:
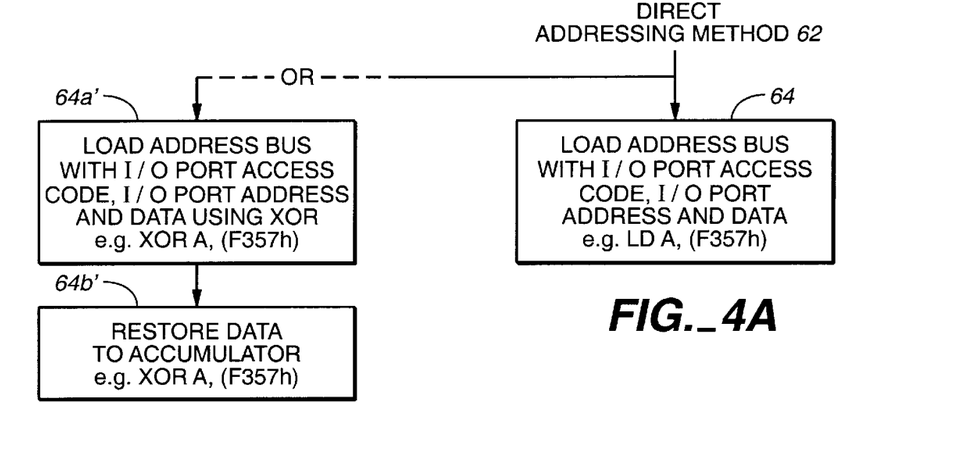
FIGS. 4A and 4B illustrates as an example programming flow diagrams for implementation of the apparatus and method of the invention.
Figure 4B:
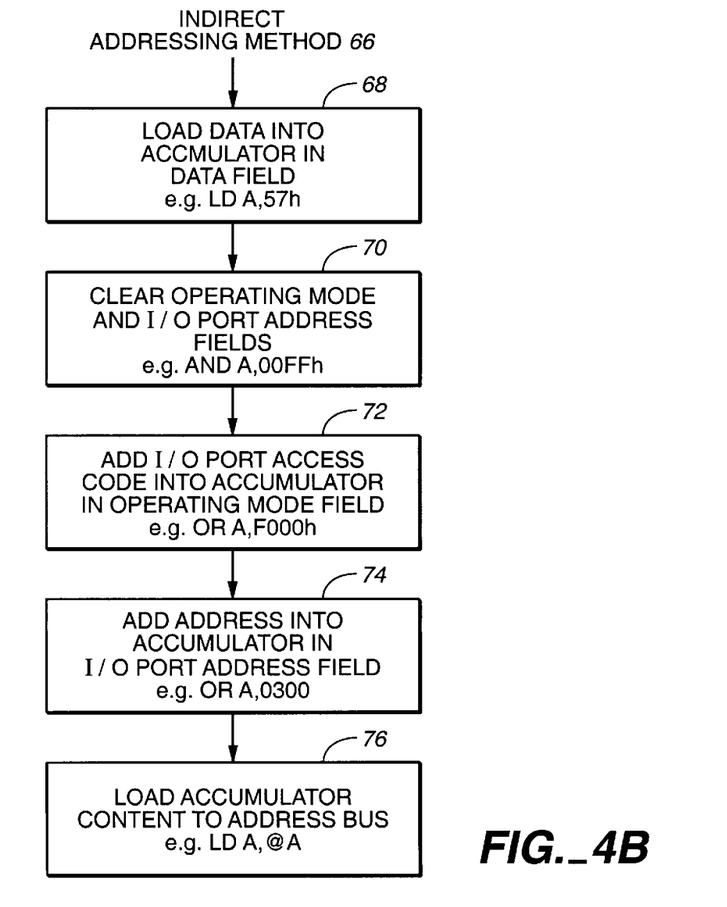

Referring to FIGS. 4A–4B, two flow diagrams are shown illustrating two methods of having the CPU 12 programmed to write data to the extended I/O ports. The program instruction set of the Z89300 controller microprocessor is used to illustrate the programming of CPU 12. The direct addressing method 62 shown in FIG. 4A involves the CPU 12 executing one instruction, referenced as step 64, which simultaneously loads the ROM address bus 22 with the I/O port access code in the operating mode field 50, the address in the I/O port address field 52, and data in the data field 54. The Z89300 controller microprocessor, for example, performs this task in one (1) clock cycle's time; and accordingly, this method provides for fast extended I/O port operations. Taking the field allocation depicted in FIG. 2, for example, if the I/O access code is (1111) or F in hex, the I/O port address is (0011) or 3 in hex and the data is (01010111) or 57 in hex, then the CPU can load all three in the appropriate fields of the ROM address bus 22, such as with an instruction of LD A,(F357h).

When a read ROM memory instruction is performed to load the content of the accumulator to the ROM address bus 22, such as in step 64 of the direct addressing method 62, the content of the CPU accumulator changes because it simultaneously reads the portion of the ROM memory 22 that is not being used, i.e. it is a portion addressed by an address reserved for extended I/O port access. However, there may be situations where further manipulation of the data by the CPU 12 is required after the data is written to the selected I/O port.

One way of retrieving the data sent to the selected I/O port for further manipulation by the CPU 12 is instead of having the CPU issue a load address instruction as in step 64 of the direct method 62, i.e. LD A,(F357h), the CPU can load the ROM address bus 22 using an exclusive-OR instruction and thereby write data to the selected I/O port, and then issue the same instruction again to "retrieve" the data sent to the I/O port. Retrieve may not be a proper word since the data is not actually retrieved from the selected I/O port, but rather the second exclusive-OR instructions reconstructs the data in the accumulator. Therefore, step 64 in the direct addressing method 64 can be replaced with, for example, instruction XOR A,(F357h) in step 64a' to write data to the selected I/O port, then second XOR A,(F357h) instruction is executed in step 64b' to restore the data to the accumulator; however, this second exclusive-OR instruction writes the same data to the I/O port, which is of inconsequence.

Another method of addressing and writing to the I/O ports is the indirect method illustrated in flow diagram of FIG. 4B. The indirect method 66 is more versatile than the direct method 62 because it allows for accessing and manipulating of data, such as reading it from ROM or RAM memory or performing calculations, and then running a subroutine to prepare the address bus for writing to the extended I/O ports.

More specifically, in step 68 data is loaded into the accumulator by whatever means, such as for example by a reading instruction or by performing calculations of some other data. Preferably, the data should be loaded in the accumulator such that it corresponds to the data field 54 of the ROM address bus 22. In the above example, this may be accomplished by the instruction LD A,57h, that is, load the accumulator with the data (57h). Then, the CPU 12 can issue an instruction 70 to clear the corresponding operating mode field 50 and the I/O address field 52 of the accumulator, in case these fields have unwanted information therein. The CPU 12 can perform this task by issuing an AND A,00FFh instruction, which logically ANDs the previous contents of the accumulator with 00FFh. The result of this instruction is that (FFh) is logically AND with the data in the data field 54, resulting in the data remaining unchanged; and (00h) is logically AND with the contents in the operating mode field 50 and the I/O address field 52, resulting in clearing the bits in these fields to zero (0). After the operation of this step, (0057h) remains in the accumulator.

The method then proceeds to add the I/O access code, for example (1111) or F in hex, to the corresponding operating mode field 50 of the accumulator in step 72. This may be accomplished by having the CPU issue an instruction OR A,F000h, which logically ORs the content of the accumulator with F000h. The result is that the I/O access code (Fh), is added to the operating mode field, and nothing, i.e. (0), is added to the other fields. Thus, what remains in the accumulator after this instruction is the I/O port access code being present in the operating mode field 50 and the data being present in the data mode field 54, i.e. (F057h).

The method thereafter proceeds to add the address of the I/O port to be written to, for example (0011) or 3 in hex, to the corresponding I/O port address field 52 of the accumulator in step 74. The CPU 12 may perform this operation by issuing an OR A,0300h instruction which logically ORs the content of the accumulator with 0300h. The result is that the I/O port address (3h) is added to the I/O port address field 52 and nothing, i.e. zero (0) is added to the other fields. Therefore, what remains in the accumulator after this step is the information needed to perform the extended I/O ports access operations, i.e. the I/O port access code in the operating mode field 50, the address in the I/O port address field 52 and the data in the data field 54, i.e. (F357h).

Finally, in step 76 the content of the accumulator is loaded onto the ROM address bus 22 for writing data to the selected I/O port of the extended I/O ports 40. This may be performed by having the CPU 12 issue an instruction LD A,@A which performs a read ROM memory instruction by loading the content of the accumulator onto the ROM address bus 22 and also placing the $\overline{\text{RDROM}}$ control line 22 in a reading rom state. As previously discussed, this instruction writes the data in the data portion 54 to the selected I/O port identified by the address in the I/O port address field 52.

Although the programming of the CPU described above illustrates a particular way of setting up the ROM address bus field allocation, there may be many other ways to program the CPU to set up the fields accordingly. In addition, the programming illustrated above was described to operate using the particular field allocation of FIG. 2; and thus other field allocations requires restructuring the program to write the proper information to the ROM address bus in its proper fields.

Figure 5:
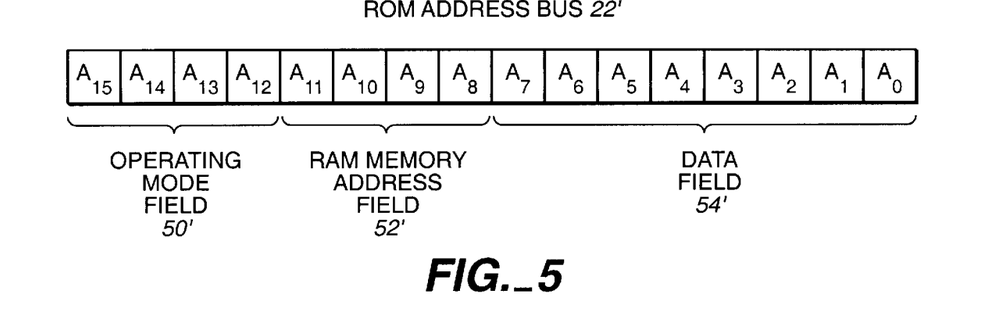
FIG. 5 illustrates as an example a diagram of assignment of fields of an address bus for performing additional RAM memory accessing tasks that are embodied in the invention.

The method described above for addressing and writing to extended I/O ports 40 is not limited to such, but can be used, for example, for addressing and writing to additional RAM memory. Referring to FIG. 5, wherein a field allocation for ROM address bus 22' is shown, the bus 22 can be partitioned into three (3) fields: an operating mode field 50' for transmitting a RAM memory access code, a RAM memory address field 52' for transmitting an address corresponding to a memory cell for which data is to be written to, and a data field 54' for transmitting to said memory cell. Thus, the method involves writing a RAM memory access code to the operating mode field 50', a RAM memory address to the RAM memory address field 52' and data to the data field 54'; detecting whether the RAM memory access code is present in the operating field 50' and the $\overline{\text{RDROM}}$ control signal 22' is in a reading ROM state; and then enabling the RAM memory for writing data thereto.

Figure 6:
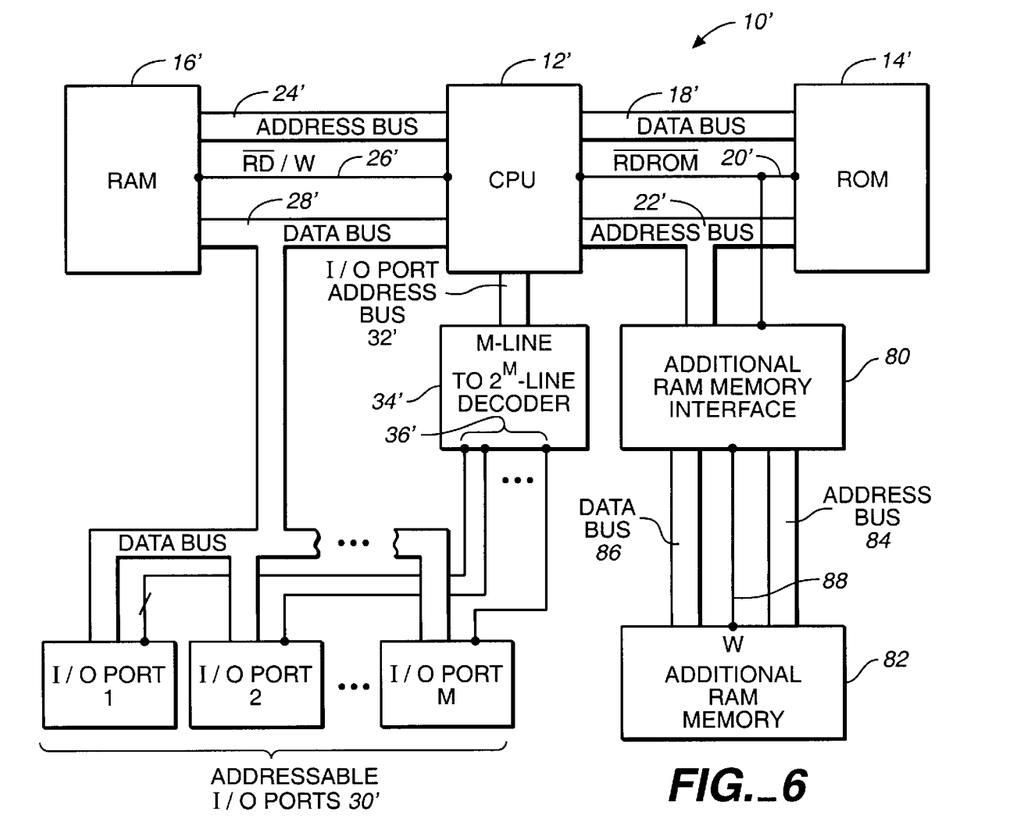
FIG. 6 illustrates as an example a block diagram of a microprocessor system for accessing additional RAM memory as embodied in the invention.

Referring to FIG. 6, a block diagram of a microprocessor system 10' for addressing and writing to additional RAM memory 82 is shown. The microprocessor system 10' is the same as the one shown in FIG. 1 except that the I/O port extender 38 has been replaced with an additional RAM memory 82 and an additional RAM memory interface 80. The term additional RAM memory shall be referred herein as RAM memory which is addressable according to the techniques of the invention, and not directly addressable as the microprocessor RAM memory 16'. The reference numbers used in FIG. 1 are the same for the same components, except that a prime is added to distinguish the systems; therefore, the discussion of those components should be referred to the discussion of FIG. 1.

The additional RAM memory interface 80 performs similar tasks as the extended I/O port interface 42 does. First, it monitors the code in the operating mode field 50' of the ROM address bus 22' and detects whether the RAM memory access code is present in field 50'. Second, it monitors the $\overline{\text{RDROM}}$ control signal 20' and detects whether that signal is in a reading-rom state. Third, it couples the address in the RAM memory address field 52' by way of the additional RAM address bus 84 for selecting a particular memory cell for which data is to be written to. Fourth, it couples the data in the data field 54' of the ROM address bus 22' to the data input of the RAM memory 82 by way of additional RAM memory data bus 86. Fifth, the additional RAM memory interface 80 enables writing data to the selected memory cell by way of control line 88 if the $\overline{\text{RDROM}}$ control signal 22' is in the reading-rom state and the RAM memory access code is present in the operating mode field 50' of the ROM address bus 22'.

Figure 7:
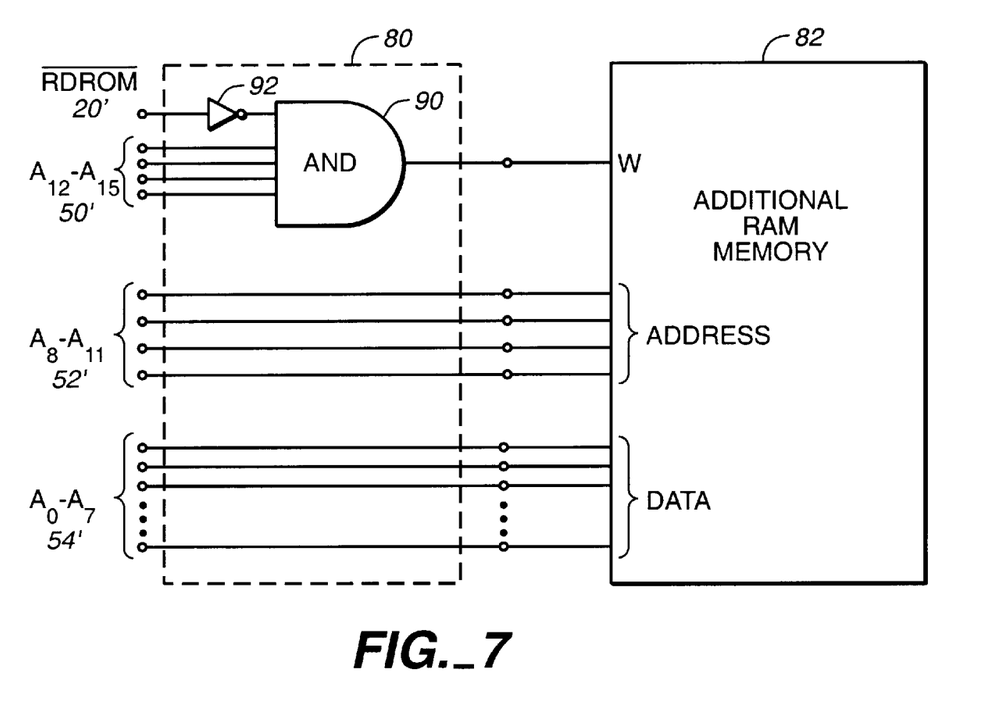
FIG. 7 illustrates as an example a block diagram of an additional RAM memory interface of the microprocessor system of FIG. 4 as embodied in the invention.

Referring to FIG. 7, a block diagram of a specific implementation for the additional RAM memory interface 80 is shown in communication with the additional RAM memory 82. This particular implementation 80 operates for the particular field allocation of the ROM address bus 22' that is exemplified in FIG. 5. In addition, this particular implementation operates for a RAM memory access code of $(A_{12}-A_{15})=(1111)$.

The additional RAM memory interface 80 includes a multi-input AND-Gate 90 having inputs coupled to the operating mode field 50' $(A_{12}-A_{15})$ of the ROM address bus 22' and another input coupled to the $\overline{\text{RDROM}}$ control signal 20' by way of an inverter 92. The AND-Gate 90 has an output coupled to the write input of the RAM memory 82. The AND-Gate 84 monitors the operating mode field 50' and the $\overline{\text{RDROM}}$ control line 20' and transmits a high to the write input of the RAM memory 82 if both the RAM memory access code and a reading-rom state have been detected. For example, if the $\overline{\text{RDROM}}$ signal is low (0) meaning it is in a reading-rom state and the operating mode field 50' ($A_{12}$–$A_{15}$) of the ROM address bus 22' contains the RAM memory access code ($A_{12}$–$A_{15}$)=(1111), then all inputs of the AND-Gate 90 are high and the AND-Gate issues a high to the write of the additional RAM memory 82. It shall be understood that if the RAM memory access code ($A_{12}$–$A_{15}$) is not defined as (1111), then other logic circuits shall be substituted for the AND-Gate 84 so that such circuits issue a high when the RAM memory access code is present in the operating mode field 50 and the $\overline{\text{RDROM}}$ control line 20' is in a reading state.

In the preferred embodiment, the RAM memory address field 52' ($A_8$–$A_{11}$) and the data field 54' ($A_0$–$A_7$) of the ROM address bus 22' is directly coupled to the address and data inputs of the RAM memory 82, respectively. The address and data fields 52', 54' have been shown in FIG. 3 to be coupled to the address and data inputs of the RAM memory by way of interface 80 to illustrate that the function of the interface is to couple to the various fields of the ROM address bus 22' in order to transmit their contents properly to the RAM memory 82.

The CPU 12' may be programmed to address and write data to the additional RAM memory 82 in the same manner as it is programmed for I/O port addressing and writing illustrated in FIGS. 4A and 4B. Therefore, reference to FIGS. 4A and 4B and its discussion should be consulted for a description on how to program the CPU for addressing and writing to the additional RAM memory 82.

It is to be understood that while the invention has been described above in conjunction with preferred specific embodiments, the description and examples are intended to illustrate and not limit the scope of the invention, which is defined by the scope of the appended claims.

I claim:

1. A method of addressing at least one I/O port for writing data thereto in a microprocessor system having a bus in data communication with a microprocessor, comprising:

writing to a first field of said bus an I/O port access code, to a second field of said bus an address for addressing a selected I/O port for writing data thereto, and to a third field of said bus data for writing to said selected I/O port;

detecting a read-ROM control signal from said microprocessor for allowing I/O port access when said read-ROM control signal is in a reading state and for not allowing I/O access when said read-ROM control signal is in a non-reading state;

detecting whether said first field of said bus contains said I/O port access code;

decoding said address in second field of said bus for selecting said selected I/O port; and writing data in third field of said bus to said selected I/O port if said I/O port access code has been detected, wherein the step of writing to the bus includes the step of writing, to an address bus.

2. A microprocessor system having a bus in communication with a microprocessor for writing data contained therein to a plurality of I/O ports, comprising:

a bus having a first, second and third field assigned to transmit an I/O access code, an address and data, respectively, said third field being coupled to the data input of said I/O ports for transmitting data thereto, wherein the bus is an address bus;

means for selecting an I/O port for writing data thereto, wherein said selecting means is coupled to said second field of said bus for receiving an address corresponding to said selected I/O port, and means for detecting said I/O access code stored in said first field of said bus, wherein said detecting means is coupled to said I/O ports for enabling writing data to said selected I/O port if said I/O access code is detected, wherein said detecting means is an AND-gate having an input coupled to said first field of said address bus for receiving said I/O access code and an output coupled to a clock input of said I/O ports.

3. A microprocessor system having a bus in communication with a microprocessor for writing data contained therein to a plurality of I/O ports, comprising:

a bus having a first, second and third field assigned to transmit an I/O access code, an address and data, respectively said third field being coupled to the data input of said I/O ports for transmitting data thereto, wherein said bus is an address bus;

a ROM memory coupled to said address bus;

means for selecting an I/O port for writing data thereto, wherein said selecting means is coupled to said second field of said bus for receiving an address corresponding to said selected I/O port;

means for detecting said I/O access code stored in said first field of said bus, wherein said detecting means is coupled to said I/O ports for enabling writing data to said selected I/O port if said I/O access code is detected; and a read-ROM control line coupled to said microprocessor and to said ROM memory, said read-ROM control line further being coupled to said detecting means for allowing I/O access if said read-ROM control line is in a reading state and for not allowing I/O access when said read-ROM is in a non-reading state.

4. A method of addressing a RAM memory for writing data thereto in a microprocessor system having a bus in data communication with a microprocessor, comprising:

writing to a first field of said bus a RAM memory access code, to a second field of said bus an address corresponding to a selected memory cell of said RAM memory for writing data thereto, and to a third field of said bus data for writing to said selected memory cell of said RAM memory;

detecting a read-ROM control signal from said microprocessor for allowing RAM memory access when said read-ROM control signal is in a reading state and for not allowing RAM memory access when said read-ROM control signal is in a non-reading state;

detecting whether said first field of said bus contains said RAM memory access code; and writing data in said third field of said bus to said selected memory cell of said RAM memory if said RAM memory access code has been detected, wherein the step of writing to the bus includes the step of writing to an address bus.

5. A microprocessor system having a bus in communication with a microprocessor for writing data contained therein to a RAM memory, comprising:

a bus having a first, second and third field assigned to transmit a RAM memory access code, an address and data, respectively, said second field being coupled to the address input of said RAM memory for transmitting an address and said third field being coupled to the data input of said RAM memory for transmitting data thereto; and means for detecting said RAM access code stored in said first field of said bus, said detecting means coupled to said RAM memory for enabling writing data to said RAM memory if said RAM memory access code is detected, wherein said detecting means is an AND-gate having an input coupled to said first field of said address bus for receiving said RAM memory access code and an output coupled to a write input of said RAM memory.

6. The microprocessor system of claim 5, further having a ROM memory coupled to said address bus, and further having a read-ROM control line coupled to said microprocessor and said ROM memory, said read-ROM control line further being coupled to said detecting means for allowing RAM memory access if said read-ROM control line is in a reading state and for not allowing RAM memory access when said read-ROM is in a non-reading state.

7. A microprocessor system having a bus in communication with a microprocessor for writing data contained therein to a plurality of I/O ports, comprising:

an address bus having a first, second and third field assigned to transmit an I/O access code, an address and data, respectively, said third field being coupled to the data input of said I/O ports for transmitting data thereto;

means for selecting an I/O port for writing data thereto, wherein said selecting means is coupled to said second field of said address bus for receiving an address corresponding to said selected I/O port, means for detecting said I/O access code stored in said first field of said address bus, wherein said detecting means is coupled to said I/O ports for enabling writing data to said selected I/O port if said I/O access code is detected; and a ROM memory operably connected to the address bus;

a read-ROM control line coupled to said microprocessor and to said ROM memory, said read-ROM control line further being coupled to said detecting means for allowing I/O access if said read-ROM control line is in a reading state and for not allowing I/O access when said read-ROM is in a non-reading state.

\* \* \* \* \*